United States Patent [19]

Macfee, Jr. et al.

[11] Patent Number: 4,647,263
[45] Date of Patent: Mar. 3, 1987

[54] NUT PLATE FASTENER

[75] Inventors: Frederick J. Macfee, Jr., Menands; Frederick J. Pufpaff, Loudonville, both of N.Y.

[73] Assignee: Simmons Fastener Corporation, Albany, N.Y.

[21] Appl. No.: 799,907

[22] Filed: Nov. 20, 1985

[51] Int. Cl.$^4$ ............................................. F16B 39/02
[52] U.S. Cl. ...................................... 411/82; 411/174
[58] Field of Search ................ 411/82, 174, 258, 523, 411/524

[56] References Cited

U.S. PATENT DOCUMENTS

| | | | |
|---|---|---|---|
| 1,691,893 | 11/1928 | Strid | 411/523 |
| 2,228,584 | 1/1941 | Place | 411/174 X |
| 2,258,555 | 10/1941 | Kost | 411/174 X |
| 2,378,257 | 6/1945 | Tinnerman | 411/174 |
| 3,123,880 | 3/1964 | Barry et al. | 411/524 X |
| 3,747,647 | 7/1973 | Ryder | 411/82 |
| 4,508,477 | 4/1985 | Oehike et al. | 411/174 |

FOREIGN PATENT DOCUMENTS 2099099 12/1982 United Kingdom ................ 411/524
2102905 2/1983 United Kingdom ................ 411/523

Primary Examiner—William F. Pate, III
Assistant Examiner—Creighton Smith

[57] ABSTRACT

A nut plate fastener, particularly adapted to retain a screw and to seal a hole in a panel having foamed-in-place insulation, comprises a sheet metal body member and a double-sided adhesive tape adhered to one face of the metal member. The metal member is a unitary member having a top leaf with a screw impression to receive and retain a screw, a "U" shaped connecting portion, and a bottom leaf having a clearance hole to guide the screw. As a safety feature, when there is high torque on the screw, a ring-like raised portion around the clearance hole may telescope into the screw impression dome to reinforce the dome. Three tabs project from the bottom face of the bottom leaf and project through the tape.

6 Claims, 7 Drawing Figures

NUT PLATE FASTENER

BACKGROUND OF THE INVENTION

The present invention relates to industrial fasteners and more particularly to nut plates.

At the present time a number of industrial fasteners are available which act like a nut in retaining a screw. Such fasteners, when formed from sheet metal, are often called "nut plates", since they retain a screw and act as a plate in distributing the load. Such nut plates are frequently employed as reinforcement members when the panel wall is relatively weak; for example, a panel may be formed of thin plastic or thin metal. In certain refrigerators, the inner wall, called a liner, is of plastic, the outer wall is of metal or plastic, and the space between them is filled with a foamed-in-place insulation. The nut plate is positioned in a pre-formed hole in the liner. The nut plate must include a means of sealing the hole so that foam does not escape through the hole during the foaming of the insulation.

It is important that the nut plate not rotate ("a spinner") or collapse when the screw is first applied or when it is tightened. The primary means of preventing spinners is the adhesive holding the nut plate to the panel. But even if the nut plate is prevented from spinning, it may fail when the screw is tightened. If excess torque is applied to the screw, the dome forming the screw impression may collapse. Since the screws are applied after the foaming of the insulation, making the nut plate generally inaccessible, the failure of the nut plate due to such dome collapse is a serious problem.

It is known, from prior patents and commercially available devices, to secure a screw or other fastener using a plate held against the inside of a wall. In Krueger U.S. Pat. No. 3,298,271 a nut plate consists, in one embodiment, of a sheet metal plate having a screw hole and a projecting tab. A double-sided foam tape, having pressure sensitive adhesive on its faces, is adhered to the bottom face of the plate and a tab from the plate projects through the tape. In Ryder U.S. Pat. No. 3,747,657 a plastic nut-plate fastener, for the plastic wall of a foamed-in-place insulation refrigerator, has a plastic body with double-sided adhesive tape. In Hoadley U.S. Pat. No. 3,802,476, also for use in a foamed-in-place refrigerator, a metal plate has a central helical screw impression, a pair of tabs and a pair of wings at opposite ends of the plate. The face of the plate is covered by a double-sided foam tape. In Knowlton, also for use in a foamed-in-place refrigerator, a metal member has a top leaf, called an "upper plate", with a screw impression; a "U" shaped connecting portion; a pair of projecting tabs ("arms") and a bottom leaf ("base"). The top leaf and bottom leaf are pressed together when the fastener is manufactured.

OBJECTIVES AND FEATURES OF THE INVENTION

It is an objective of the present invention to provide a nut plate fastener which will permit relatively fewer spinners due to the initial torque of the inserted screw and which will provide a relatively stronger structure to prevent collapse of the screw impression dome when the screw is tightened, i.e., higher torque resistance.

It is a further objective of the present invention to provide such a nut plate which will have an internal spring effect, due to trapped foam and the spring force from its "U" shaped end, so that it acts similar to a spring washer and exerts spring pressure on the screw thread, in order to prevent the screw from being loosened because of vibration.

It is a further objective of the present invention to provide such a nut plate whose body portion is constructed of sheet metal, a relatively inexpensive material, and which does not require expensive manufacturing procedures such as heat treatment.

It is a further objective of the present invention to provide such a nut plate which may be manufactured using high-speed production machinery.

It is a further objective of the present invention to provide such a nut plate which presents a low profile, in side view, so that it is less likely to be accidentally dislodged in the pre-foaming assembly operations and so it may be installed automatically by robot devices, in refrigerators and in other appliances.

It is a further objective of the present invention to provide such a nut plate which readily centers in both round and rectangular panel holes and which self-aligns to present the center of its screw impression hole directly aligned with the center of the panel hole.

It is a further objective of the present invention to provide such a nut plate which provides a guidance and clearance hole for the screw so that the screw is guided to the center of the screw impression hole, even when the screws are installed by high-speed machines.

It is a feature of the present invention to provide a nut plate adapted to be positioned in a hole in a panel. For example, the nut plate may be located in a pre-formed hole in a panel prior to the installation of foamed-in-place insulation. The panel may be the plastic liner wall of a refrigerator. The nut plate retains a threaded screw member inserted through the hole after the foam has hardened.

The nut plate consists of a metal member and a double-sided pressure sensitive adhesive tape. The metal member is a one-piece integral member formed from sheet metal. It includes a top leaf having a screw impression, preferably a helical screw impression dome, formed in the top leaf and having a hole therethrough. The screw impression receives and retains the screw threads of the screw member.

A bottom leaf has a bottom face which abuts the panel. The bottom leaf has a clearance hole whose center is aligned with the center of the screw impression hole. The clearance hole is wider than the screw member, i.e., has a larger diameter, so that the clearance hole guides the screw member and does not retain its threads. The bottom leaf has at least two tabs, and preferably three tabs, projecting from its bottom face. The bottom leaf has a ring-like raised portion directed toward the top leaf. The raised portion has a smaller circumference (at its top) than the bottom opening of the screw impression dome. If the screw should be over-tightened, as a safety feature, the raised portion telescopes into, and reinforces, the screw impression dome.

A "U" shaped connecting portion connects the bottom leaf and the top leaf, and preferably has a hole to permit the foam to flow through. The two leaves are kept separated so that foam insulation may fill the space between the leaves. The nut plate further includes a double-sided foam adhesive tape or other type of adhesive sheet secured to the bottom face of the bottom leaf. The adhesive sheet, such as the foam tape, covers the clearance hole and has a pressure sensitive adhesive on its exposed face, which is covered by a protective paper sheet.

In order to perform its function and support its load, the nut plate must, when sealed and tightened, be able to accept, without failure or collapse, a specified amount of torque, and this amount can be substantial, for example, fifteen inch pounds of torque in certain applications. To accept a given and significant amount of torque, the screw impression must be strong and must fit tightly to the screw with what is called an "interference fit". Under these conditions, considerable torque is required just to turn the screw into the screw impression before the plate is sealed and tightened, i.e., before the development of any axial loading to resist "spinning". The necessity for this strength and tightness of fit, before the development of any axial loading, is what gives rise to "spinners".

It is a further feature of the present invention that the initial strength and tightness of the screw impression can be relatively lower so as not to produce "spinners". As the top leaf is drawn down compressing the foam and axially loading the bottom leaf, the whole plate develops a high resistance to "spinning" and, at the same time, the strength of the screw impression becomes bolstered by the supporting ring on the bottom leaf. During this stage, the plate becomes able, as a safety feature, to accept a high torque on the screw, for example, thirty inch pounds of torque, without failure or collapse, and it will not spin.

It is still another feature of the present invention that the upper leaf and its "U" connection form a spring which acts as a shock absorber when an instantaneous force is applied to the screw member. For example, when a bottle is dropped on a refrigerator shelf, the spring effect of the nut plate or shock absorber diminishes the force transmitted to the refrigerator liner.

SUMMARY OF THE INVENTION

In accordance with the present invention, a nut plate is provided that is especially adapted to retain a screw in a foamed-in-place structure, such as a refrigerator plastic wall. The nut plate comprises, as portions formed from a single piece of sheet metal, an upper leaf, a "U" shaped end portion and a bottom leaf. The upper leaf has a screw impression hole to receive and retain a screw. The impression has a dome which is directed upwardly, i.e., away from the bottom leaf. The bottom leaf has at least two, and preferably three, tabs which protrude from its face and which center the nut plate in alignment with the center of the hole in the panel. The bottom leaf has a "clearance" hole, i.e., a hole larger than the screw, having a cut-off funnel shape, directed away from the bottom leaf. A double-sided adhesive foam tape is adhered to the face of the bottom leaf and, before installation, is covered by a removable paper.

In use, the installer will strip the paper from the foam face, locate the tabs in the hole in the panel, and press the nut plate against the panel wall to adhere it to the wall. The foam tape prevents the nut plate from turning ("spinning") when the screw is installed.

The structure is then filled with the stiff foam insulative material. Subsequently a screw may be screwed into the nut plate. The screw passes through the clearance hole and is screwed into the screw impression. As the screw is tightened down it draws the upper leaf toward the lower leaf. If excessive torque is applied to the screw, as a safety measure, the cut-off funnel on the lower leaf enters the dome of the upper leaf, providing, in effect, a multiple-walled screw impression which strongly resists torque stripping. The "U" shaped end portion, and the foam trapped between the upper and lower leaves, provide a constant spring action to the upper leaf which prevents loosening of the screw due to vibration. In addition, that spring action, of the end portion and trapped foam, provides some shock protection against rapid pulling forces on the screw, for example, due to dropping a bottle on a refrigerator shelf.

BRIEF DESCRIPTION OF THE DRAWINGS

Other objectives and features of the present invention will be apparent from the following detailed description, taken in conjunction with the accompanying drawings.

In the drawings.

DETAILED DESCRIPTION OF THE INVENTION

Figure 1:
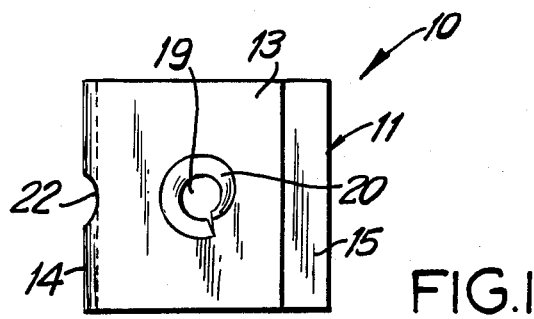
FIG. 1 is a top plan view of the nut plate of the present invention.
Figure 2:
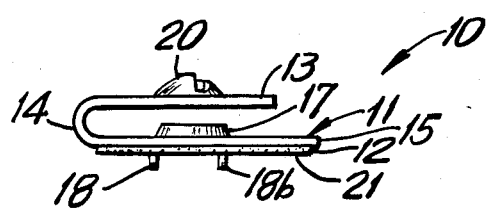
FIG. 2 is a side view, from one side, of the nut plate of FIG. 1.
Figure 3:
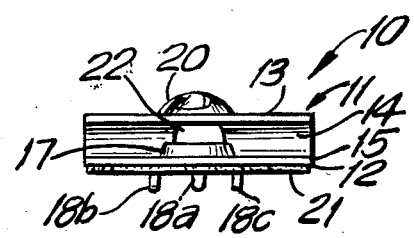
FIG. 3 is a side view, from one end, of the nut plate of FIG. 1.
Figure 4:
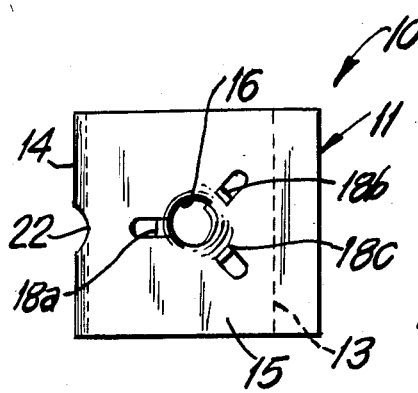
FIG. 4 is a bottom plan view of the metal body member of the nut plate of FIG. 1, with the tape removed.

The nut plate of the present invention is described herein primarily in the context of a foamed-in-place structure, such as a refrigerator, in which thermal insulation is foamed between the inner plastic wall panel of the refrigerator case and outer steel wall panel. However, the nut plate may also be employed in other situations, for example, to provide support to a plastic or metal panel without foam insulation.

The nut plate 10, as shown in FIGS. 1–4, comprises a metal body member 11, preferably stamped from sheet metal, and a plastic foam double-sided adhesive tape 12. The body member 11 consists of, as portions of a one-piece unitary member, an upper leaf 13, a connecting "U" shaped end portion 14 and a bottom leaf 15.

The bottom leaf acts as a plate member and bears against the wall to distribute the load. The bottom leaf 15 has a hole 16 therethrough. The metal from the hole is forced upwards to form a ring 17 in the shape of a cut-off guide funnel.

Three tabs 18a–18c are punched, or otherwise formed, from the lower leaf. The tabs are spaced about the circumference of the hole 16. The tabs are arranged so that, when the nut plate is inserted in the panel hole, the nut plate will be centered in the panel hole. Consequently, the tabs are positioned and spaced in accordance with the size of the panel hole, so that the tabs will fit closely within the panel hole.

The upper leaf 13 has a screw impression hole 19 formed by a dome-shaped screw impression 20. For example, the screw impression may be formed by commercially available tools.

The top diameter of the ring 17 is smaller than the bottom diameter of the dome 20 so that they may be brought closer by tightening the inserted screw. The ring 17 will partly nestle in the foam in the screw impression dome 20 and reinforce the dome 20. Such reinforcement provides a strong resistance to collapse of the dome 20 by torque from the screw. This provides a saving in the metal, as a relatively thinner sheet metal may be used to form the nut plate. The limiting factor in reducing the thickness of the metal is the required strength of the screw impression dome. However, since the screw impression dome 20 is reinforced by the nested ring 17, thinner sheet metal may be employed for the nut plate.

A double-sided adhesive tape 12 is secured to the front face of the bottom leaf 15. The tape 12 is an open cell polyolefin foam tape coated with pressure-sensitive adhesive on both its faces. Its inner face is adhered to the bottom leaf 15 and its outer face is covered by an easily removable paper sheet 21. An alternative sealer to the double-sided tape is a flexible sheet of pliable adhesive material, similar to rubber caulking compound, made from rubber or plastic resins.

Figure 5:
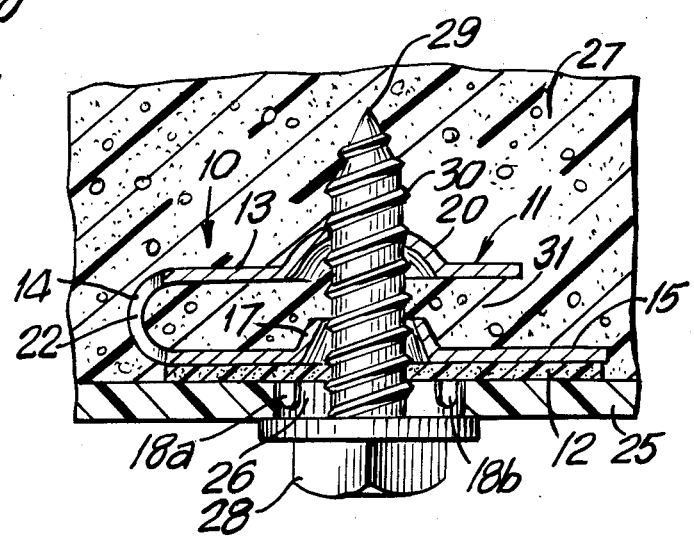
FIG. 5 is a side cross-sectional view of an installed nut plate and screw, in which the screw is not tightly screwed down.
Figure 6:
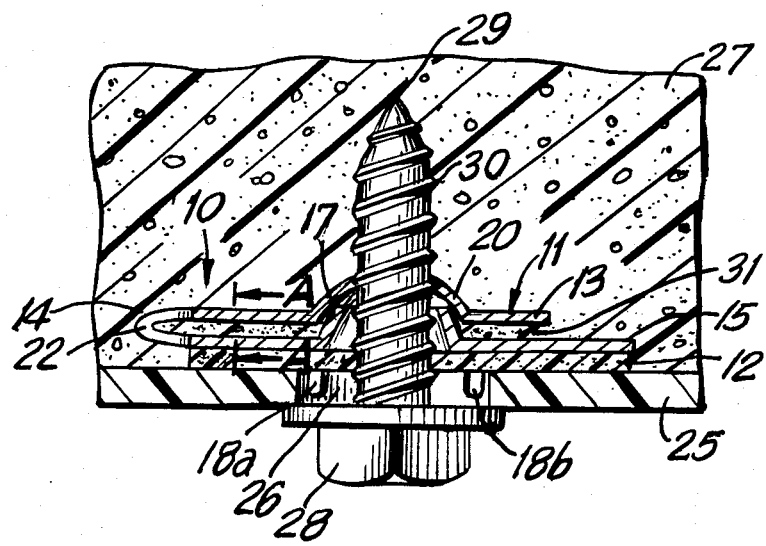
FIG. 6 is a perspective view of the metal body member of the nut plate of FIG. 4.

In operation, as shown in FIG. 5, a plastic panel 25 has a hole 26. The nut plate 10 is centered in relationship to hole 26 by its tabs 18a–18c. The foam tape 12 covers the hole 26. The area behind panel 25 is filled with insulative plastic foam 27. The tape 12 prevents the foam from leaking through the hole 26. After the foam 27 has hardened, a screw 28 is inserted through the hole 26. The screw tip 29 penetrates the tape 12 and the screw shank 30 is guided by the ring 17 so that the screw tip 29 centers the hole of the screw hole impression 20. As the screw is rotated, its shank 30 centers the screw hole impression 20 which acts as a nut to the helix of the screw shank. The screw is securely fastened in the position illustrated in FIG. 5. The screw is kept under some tension and resists dislodgement because of vibration, due to the spring action of the "U" shaped end portion 14 and the spring action of the foam 31 trapped and compressed between the upper leaf 13 and the lower leaf 15.

In extreme cases the screw 28 may be further rotated and tightened. The upper leaf 13 is drawn toward leaf 15, further compressing the trapped foam 31. The ring 17 becomes nested within the foam in the screw impression dome 20. In effect, the dome 20 has a reinforced wall which strengthens it against collapse, should the screw be further tightened.

Figure 7:
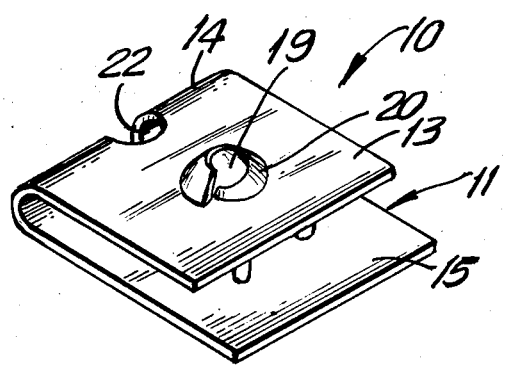
FIG. 7 is an enlarged cross-sectional view, taken along A—A of FIG. 6.
Figure 8:
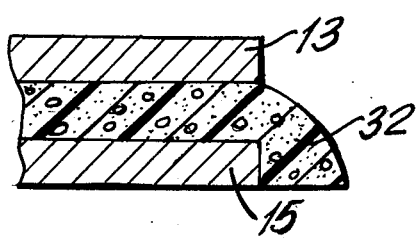

As shown in FIG. 7, the foam 32 squeezed out from between the leaves 13,15 is stiff and, since it is connected to the foam trapped between the leaves, in effect acts as part of the leaf 15 to present a larger plate, on two opposite sides, to the wall. That effect, of a larger plate, helps distribute the load.

The end portion 14 has a hole 22 therethrough which permits the foam to enter between the leaves. Preferably the lower leaf is longer than the upper leaf.

Modifications may be made in the nut plate of the present invention within the scope of the subjoined claims. For example, a wall may be formed as an integral portion of the metal member and connected to either leaf. The free end of such an opposed wall will bear against the opposite leaf upon partial squeezing of the leaves. Such a wall forms a box-section having increased strength and preventing the leaves from being fully collapsed against each other.

In another modification, one or more tabs may be formed from one of the leaves and extend into the space between the leaves. Such a tab would prevent the fasteners from being tangled with each other during production. Preferably the fasteners are formed on an elongated double-sided adhesive tape and sold wound about each other in the form of a reel. Alternatively, they may be formed on individual rectangles of tape.

In still another modification, the funnel-shaped raised ring (drawn hole) may be replaced by a plain hole. In certain applications, the tabs are not needed, for example, in robot or other mechanical placement of the fastener. For such applications the protruding tabs may be omitted. In both of these modifications, the feature is retained of compressing the foam between the leaves to help prevent failure due to vibration or shock.

What is claimed is:

1. A nut plate adapted to be positioned in a hole in a panel prior to the installation of foamed-in-place insulation and to retain a threaded screw member inserted through the hole after the installation of said insulation, the nut plate comprising:
    an integral metal member formed from sheet metal and having as portions thereof:
    a top leaf, a screw impression formed in said top leaf and having a hole therethrough, said screw impression receiving and retaining said screw threads;
    a bottom leaf having a bottom face adapted to abut said panel and having a clearance hole therethrough whose center is alinged with the center of said screw impression hole;
    a ring-like raised portion about said clearance hole on said bottom leaf and directed toward said top leaf to guide said screw; said raised portion having a smaller circumference at its top than the bottom opening of said screw impression so that, upon tightening said screw said raised portion may telescope into and compress the intervening foam to reinforce said screw impression;
    said clearance hole and raised portion being wider than said screw member so as to guide said screw member and yet not retain its threads;
    at least one locating tab projecting from the bottom face of said bottom leaf to locate the nut plate relative to the said panel hole; and
    a generally "U" shaped connecting portion connecting said bottom leaf and said top leaf and separating the bottom leaf from the top leaf at a selected distance so that said insulation may be inserted between the two said leaves;
    said insulation inserted between said bottom leaf and said top leaf;
    the nut plate further comprising an adhesive means secured to said bottom face of said bottom leaf, covering said clearance hole and having a bottom pressure sensitive adhesive on its exposed face to adhere said nut plate to said panel.

2. A nut plate as in claim 1 and further including a sheet which removably covers said exposed face of the adhesive sheet.

3. A nut plate as in claim 1 wherein said metal member has three of said projecting tabs.

4. A nut plate as in claim 1 wherein said "U" shaped portion has a hole therethrough.

5. A nut plate adapted to be positioned in a hole in a panel prior to the installation of foamed-in-place insulation and to retain a threaded screw member inserted through the hole after the installation of said insulation, the nut plate comprising:
    an integral metal member formed from sheet metal and having as portions thereof;

a top leaf, a helical screw impression dome formed in said top leaf and having a hole therethrough, said screw impression receiving and retaining said screw threads;

a bottom leaf having a bottom face adapted to abut said panel and having a clearance hole therethrough whose center is aligned with the center of said screw impression hole, a ring-like raised portion about said clearance hole on said bottom leaf and directed toward said top leaf to guide said screw, said raised portion having a smaller circumference at its top than the bottom opening of said dome so that, upon tightening said screw said raised portion telescopes into and compresses the intervening foam to reinforce, said screw impression dome;

said clearance hole and said raised portion being wider than said screw member so as to guide said screw member and yet not retain its threads;

three tabs projecting from the bottom face of said bottom leaf; and a generally "U" shaped connecting portion connecting said bottom leaf and said top leaf and separating the bottom leaf from the top leaf so that insulation may be inserted between the two leaves;

said insulation inserted between said bottom leaf and said top leaf;

the nut plate further comprising an adhesive sheet secured to said bottom face of said bottom leaf, said sheet being a double-sided foam tape, said tape covering said clearance hole and having a bottom pressure sensitive adhesive on its exposed face.

6. A nut plate as in claim 5 wherein said "U" shaped portion has a hole therethrough.

* * * * *